United States Patent
Lyon

(10) Patent No.: US 7,102,521 B2
(45) Date of Patent: Sep. 5, 2006

(54) METHOD AND SYSTEM FOR IDENTIFYING RFID-TAGGED OBJECTS

(75) Inventor: Geoff M. Lyon, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 243 days.

(21) Appl. No.: 10/836,547

(22) Filed: Apr. 30, 2004

(65) Prior Publication Data

US 2005/0246247 A1 Nov. 3, 2005

(51) Int. Cl.
  *G08B 13/14* (2006.01)
(52) U.S. Cl. ............... 340/572.4; 235/439; 340/572.7
(58) Field of Classification Search ............ 340/572.4, 340/572.7, 572.8, 505, 10.1, 523; 235/439, 235/492; 343/866, 878, 895
  See application file for complete search history.

(56) References Cited

U.S. PATENT DOCUMENTS

| | | | |
|---|---|---|---|
| 6,208,062 B1* | 3/2001 | Nysen et al. .......... | 310/313 R |
| 6,373,388 B1* | 4/2002 | Dames .................. | 340/572.2 |
| 2003/0174099 A1 | 9/2003 | Bauer et al. | |
| 2004/0195319 A1* | 10/2004 | Forster .................. | 235/385 |
| 2005/0060246 A1* | 3/2005 | Lastinger et al. ........... | 705/28 |
| 2005/0131578 A1* | 6/2005 | Weaver ................... | 700/244 |
| 2005/0242183 A1* | 11/2005 | Bremer .................. | 235/439 |

OTHER PUBLICATIONS

Patent Abstracts of Japan—vol. 2002 No. 5 May 3, 2002—Denso Corp.

* cited by examiner

*Primary Examiner*—Thomas Mullen

(57) ABSTRACT

A system and method for identification of RFID-tagged items includes one or more interrogator units communicating over a network, the interrogator unit comprising a hanger support upon which RFID-tagged items are stored, the hanger support further comprising one or more solenoid coils aligned with the hanger support's longitudinal axis. The system further includes a computer capable of communicating over the network and an inventory database indexable by item identification, including the ordering of the items on the hanger, and capable of communicating over the network. The method for identifying the stored items includes receiving RFID tag signals from the stored items, generating a null RFID interrogation field, and moving the null RFID interrogation field to identify an item by its RFID tag signal dropout in response to the null RFID interrogator field encompassing the item's RFID tag.

20 Claims, 6 Drawing Sheets ns used as item storage hangers in accordance with one
METHOD AND SYSTEM FOR IDENTIFYING RFID-TAGGED OBJECTS

BACKGROUND

The present invention relates to radio frequency identification (RFID) tags.

A tag serves to identify the thing to which it is attached. RFID tags can be attached to items to aid in their identification, speed checkout processing in a retail environment and aid in inventory management. The RFID tag is scanned or "interrogated" using radio frequency electromagnetic waves. Interrogating the RFID tag with radio waves allows the interrogator to be out of direct line-of-sight of the tagged item and to be potentially located at a greater distance from the item than is permitted with optical scanning.

RFID tags can be either active or passive. Active RFID tags carry their own energy source and passive tags derive their energy from the interrogator's radio signal. When a passive RFID tag is in the vicinity of an interrogator, its antenna receives energy from a radio signal broadcast by the interrogator. This energy is rectified and used to power the RFID tag's integrated circuit. After the passive tag's integrated circuit is powered on, it sends its information to the interrogator.

To reduce costs, inexpensive RFID tags generally do not have a conventional radio transmitter; instead, they communicate with a nearby interrogator using a communication technique known as "backscatter propagation." Backscatter propagation involves modulating the antenna matching impedance of the RFID tag with the information to be sent to the interrogator. Modulating the impedance in this manner causes varying amounts of radio energy to be reflected from the tag's antenna, which are received and demodulated by the interrogator.

While radio interrogation techniques such as backscatter propagation allow an interrogator to identify a group of RFID tags en masse, determining the physical ordering of the tagged items is problematic. Lack of control over the ordering of items on display can be disadvantageous in a retail situation. For example, when selling items with expiration dates, it is desirable to sell items with the earliest expiration date first. Unfortunately, items displayed on hangers tend to be older at the back than at the front. This is because customers tend to pick items from the front of a display when items at the back are less accessible. This effect is further compounded if the stockers adding new stock cannot readily identify the age of the old stock or if they do not take the extra time to rotate the old stock to the front for easier access.

Accordingly, there is a need for a system to precisely determine the ordering of tagged items in a locality using RFID.

BRIEF DESCRIPTION OF THE DRAWINGS

The present invention is illustrated by way of example and not limitation in the figures of the accompanying drawings in which.

Like reference numbers and designations in the various drawings indicate like elements.

SUMMARY OF THE INVENTION

Figure 1:
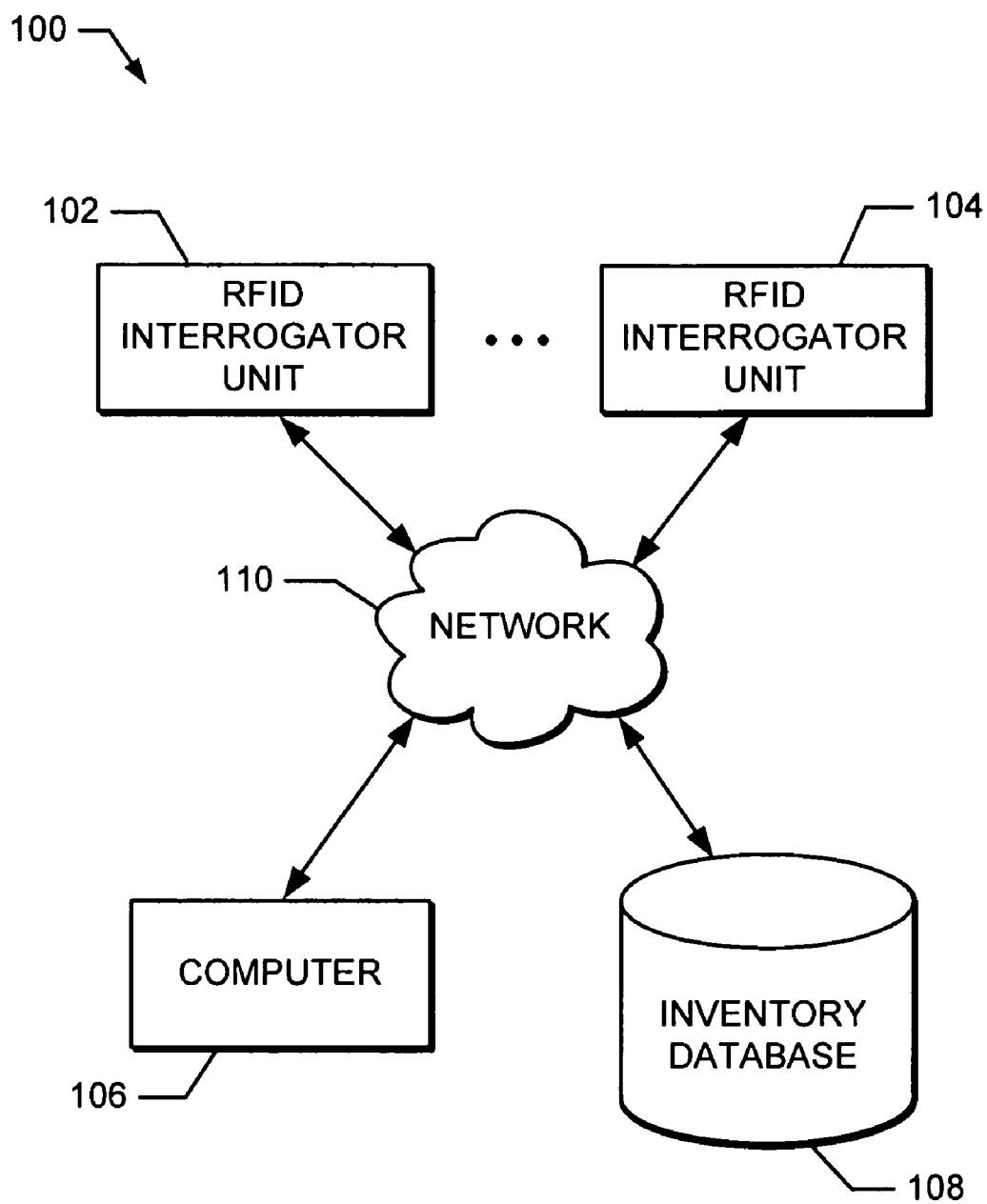
FIG. 1 is a diagram illustrating a system organization of the RFID interrogator system in accordance with one implementation of the present invention.

One aspect of the present invention features a system for identifying RFID-tagged items. The system for identification of RFID-tagged items includes one or more interrogator units communicating over a network, the interrogator unit comprising a hanger support upon which RFID-tagged items are stored, the hanger support further comprising one or more solenoid coils aligned with the hanger support's longitudinal axis. The system further includes a computer capable of communicating over the network and an inventory database indexable by item identification, including the ordering of the item on the hanger, and capable of communicating over the network.

Another aspect of the present invention features a method for identifying stored items. The enumeration of the aggregate of stored items includes receiving RFID tag signals from the stored items, generating a null RFID interrogation field, and moving the null RFID interrogation field to identify an item by its RFID tag signal dropout in response to the null RFID interrogator field encompassing the item's RFID tag.

DETAILED DESCRIPTION

Implementations of the present invention use multiple solenoid coils to form an RFID interrogator antenna. Operating multiple solenoid coils with in-phase interrogating signals creates an RFID interrogation field that reads many RFID tags in its vicinity. In-phase interrogating signals excite two or more coils with equal and in-phase driver signals producing a continuous field distribution across the region of interest, hereinafter referred to as a "uniform" field. In one implementation, this uniform field is similar in formation to that observed by a Helmholtz coil arrangement, but without strict adherence to the Helmholtz dimensional constraints. Accordingly, the uniform field referred to herein has a continuous field distribution to facilitate reading multiple RFID tags yet does not require a constant field strength or direction over the entire region of interest.

By operating the solenoid coils with out-of-phase interrogating signals, the resulting RFID field produced through destructive interference has a null portion that does not detect the same set of RFID tags in the vicinity. Implementations of the present invention enumerate an RFID tag's specific position by systematically moving this null portion of the RFID interrogation field (hereinafter, the null RFID interrogation field) and then comparing the total number of RFID tags first identified in the vicinity with the RFID tags not detected when the out-of-phase interrogating signals drive the solenoid coils.

Aspects of the present invention are advantageous in at least one or more of the following ways.

In one implementation of the present invention, the solenoid coils are integrated into the design of a hanger used to display items in a commercial environment. Such a hanger is advantageous in that it facilitates the tracking of inventory while also serving to display the items. Furthermore, the order of items stored on the hanger can be determined. The order of items is important for perishable or other time-sensitive goods where general retail practice is to have the oldest items at the front so that they will likely be purchased before newer items at the back.

A further advantage of the present invention is that misplaced items can be quickly identified and returned to their proper locations. In a commercial environment, customers will often remove an item from its display hanger for closer inspection. If the customer decides not to purchase the item, it is frequently returned to the wrong hanger. Left unchecked, this process can create enough disorder in the display such that subsequent customers become frustrated in searching for what they want.

Turning first to FIG. 1, a diagram illustrates an RFID interrogator system 100 in accordance with one implementation of the present invention. In this implementation, RFID interrogator system 100 includes one or more interrogator units 102, 104, a computer 106, and an inventory database 108, all communicating over a network 110. Network 110 can either be a local network or the Internet.

Interrogator unit 102 includes a hanger support for storing RFID-tagged items, the hanger support further comprises solenoid coils aligned with the hanger support's longitudinal axis that are capable of generating both uniform and null interrogator fields for determining a item identification using RFID. The uniform interrogator field is used to identify all the items on the hanger support while the null interrogator field facilitates identifying the position and order of each identified item.

In one implementation, inventory database 108 includes the ordering of items on the hanger associated with interrogator unit 102 along with an item description and an item date code. The item date code is the date of manufacture or expiration date associated with the item and is useful when ordering the items on the hanger. To improve access, entries in the database are indexable by item identification, hanger location or any other field in the database useful by implementations of the present invention. Alternate implementations of the present invention may include greater or fewer fields in inventory database 108 than those described previously as deemed fit for the particular application and use.

In another implementation, interrogator unit 102 sends an ordered list of item identifications stored in a single location to computer 106 over network 110 in response to a request from computer 106 received over network 110. For example, a single location can be a single hanger, a group of hangers within a physical area or a logical grouping of hangers by item or fields in inventory database 108. Computer 106 indexes inventory database 108 with the identification of interrogator unit 102 and each item identification to obtain an item description and a corresponding item date code. The item description along with its proper storage location is sent to computer 106 over network 110. Computer 106 calculates if any incorrect items are stored on interrogator unit 102 and if the items stored on interrogator 102 are stored in a preferred date ordering. For example, the preferred date ordering may place older items at the front and newer items at the back, newer items in the front with older items at the back, randomly distribute the items along the hanger or any other distribution appropriate for the particular application.

In yet another implementation, interrogator unit 102 periodically indexes inventory database 108 with the item identifications of the items stored upon it. Inventory database 108 responds by sending the item's description over network 110 to interrogator unit 102. Interrogator unit 102 calculates if any incorrect items are stored upon it or if the items are stored in the preferred date ordering as previously described. At predetermined time intervals, computer 106 queries interrogator unit 102 directly as to the items stored upon it including any anomalous item storage conditions. For example, item storage conditions may include information about a misplaced item, an improper stock arrangement and other stocking conditions of interest to the particular inventory application or implementation.

In still yet another implementation, interrogator unit 102 indexes inventory database 108 with an item's identification when the item is first placed upon it. Inventory database 108 responds by sending the item description and its proper storage location over network 110 to interrogator unit 102. Interrogator unit 102 calculates if the item is in its proper location. Conversely, when the item is removed from the interrogator unit, the item identification and its location are also sent to computer 106 over network 110. Additionally, if any anomalous item placement occurs, a message describing the condition is sent to computer 106 over network 110. At predetermined time intervals, interrogator unit 102 sends its identification along with identifications and ordering of the items stored upon it to computer 106 over network 110.

Figure 2A:
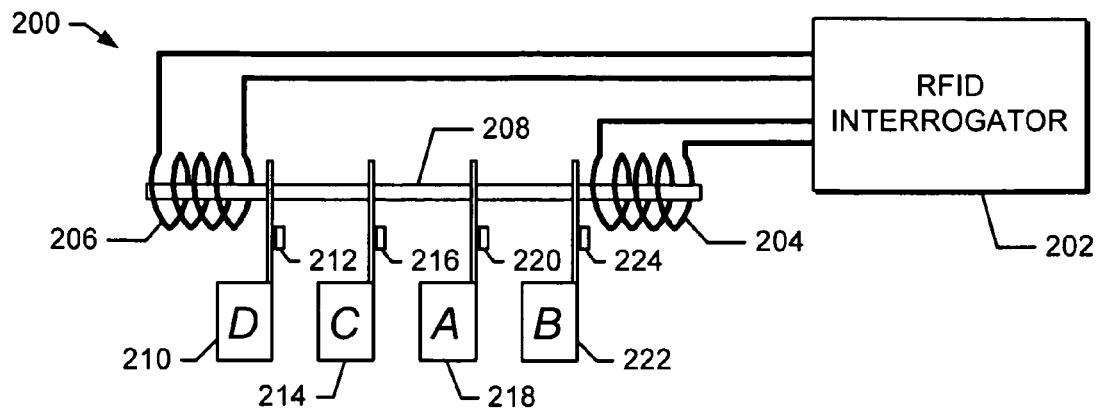
FIG. 2A is a diagram illustrating an RFID interrogator unit and hanger incorporating RFID solenoid coils in accordance with one implementation of the present invention.

Turning now to FIG. 2A, a diagram 200 illustrates an RFID interrogator unit 202 and item hanger 208 incorporating RFID solenoid coils 204, 206 in accordance with one implementation of the present invention. Stored upon item hanger 208 are four items: item D 210 with its associated RFID tag 212, item C 214 with its associated RFID tag 216, item A 218 with its associated RFID tag 220, and item B 222 with its associated RFID tag 224.

In one implementation of the present invention, solenoid coils 204, 206 are placed at either end of item hanger support 208 and arc wound around its longitudinal axis. Operating solenoid coils 204, 206 with in-phase RFID interrogator signals creates a substantially uniform RFID interrogation field whereby the aggregate of RFID tags 212, 216, 220, 224 and their associated items can be identified. However, the in-phase interrogation field cannot determine the ordering sequence of the tags upon hanger 208. In an alternate implementation of the present invention, solenoid coils 204, 206 are aligned with the longitudinal axis of hanger support 208 rather than being wound around hanger support 208.

Exciting solenoid coils 204, 206 with out-of-phase RFID interrogator signals creates a moveable null interrogator field whose position can be changed by varying the relative amplitudes of the interrogator signals supplied to solenoid coils 204, 206. By moving the null interrogator field across RFID tags 212, 216, 220, 224 in a predetermined manner, their relative positions can be determined. The scanning operation will be described in detail later herein.

Figure 2B:
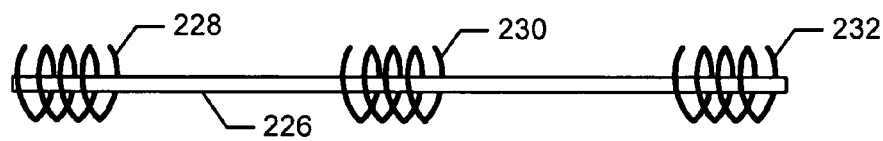
FIG. 2B is a diagram illustrating an RFID interrogator antenna using three solenoid coils in accordance with one implementation of the present invention.

FIG. 2B is a diagram illustrating an RFID interrogator antenna using three solenoid coils 228, 230, 232 in accordance with one implementation of the present invention. Solenoid coils 228, 230, 232 are wound around the longitudinal axis of hanger 226 to form an RFID interrogator antenna. Using three or more coils in this manner allows the RFID interrogator field to cover a longer distance, enabling the use of the invention with a longer hanger 226. For example, all RFID-tagged items stored on hanger 226 can be interrogated by operating solenoid coils 228, 230, 232 with in-phase interrogator signals. The sequential ordering of RFID-tagged items stored on hanger 226 can be determined by moving the null interrogator field between solenoid coils 228 and 230 and between solenoid coils 230 and 232.

Figure 2C:
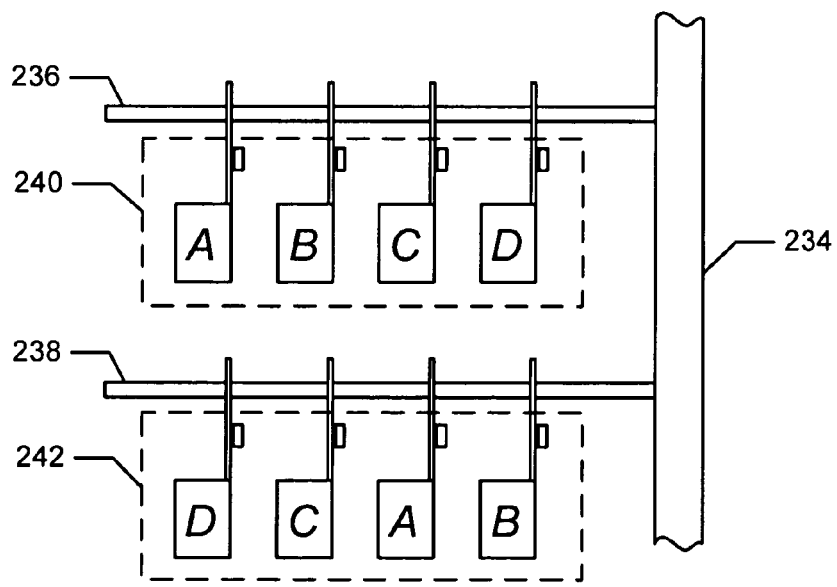
FIG. 2C is a diagram illustrating RFID interrogator antennas used as item storage hangers in accordance with one implementation of the present invention.

FIG. 2C is a diagram illustrating RFID antennas 236, 238 used as item storage hangers in accordance with one implementation of the present invention. Multiple hangers 236, 238 are attached to a support 234 to provide high-density display and storage of groups of RFID-tagged items 240, 242. The disposition of groups of RFID-tagged items 240, 242 can be readily determined using hangers 236, 238 where each hanger incorporates two or more RFID solenoid coils that can be used to ascertain the sequence of items stored on their respective hangers. For example, tagged items 240 represent properly sequenced stock with oldest item A at the front, followed by increasingly newer items B and C with the newest item D at the back. By reading the order of items on hanger 238, a stock monitoring system can determine that tagged items 242 are not arranged in the proper order with respect to the age of the items with the newest item D placed at the front of the hanger followed by the next-newest item C.

Figure 3A:
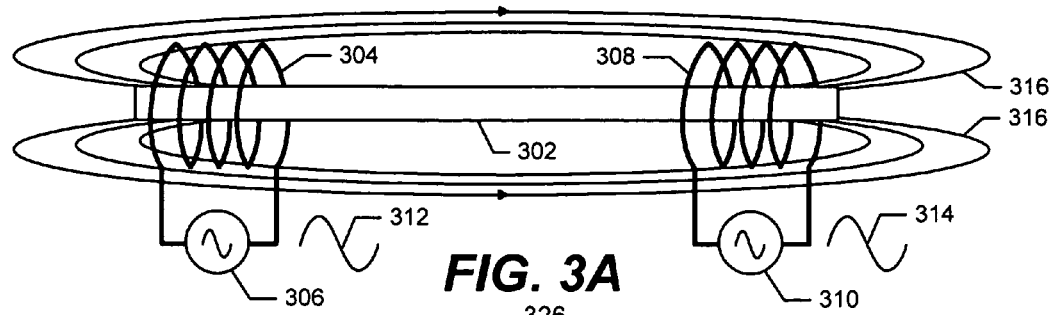
FIG. 3A is a diagram illustrating the generation of a uniform RFID interrogation field using in-phase interrogator signals in accordance with one implementation of the present invention.

FIG. 3A is a diagram illustrating the generation of a uniform RFID interrogation field 316 using in-phase interrogator signals 312, 314 in accordance with one implementation of the present invention. A left solenoid coil 304 and a right solenoid coil 308 are wound at opposite ends of core 302. Core 302 also serves as a hanger. Left signal source 306, whose signal phase and amplitude are depicted by waveform 312, excites left solenoid coil 304. Similarly, right signal source 310, whose signal phase and amplitude are depicted by waveform 314, excites right solenoid coil 308. Solenoid coils 304 and 308 work together to produce uniform RFID interrogator field 316.

Signals 312 and 314 are oscillating signals that are termed to be "in-phase" because they both reach their positive and negative peaks at substantially the same time. Solenoid coils 304 and 308 are similar in that they are both wound in the same direction, both aligned with the longitudinal axis of core 302, and are both connected with the same polarity to signal sources 306 and 310. When similar solenoid coils are excited with in-phase signals a uniform field is produced. In another implementation of the present invention, a substantially equivalent uniform field can also be generated by reversing the winding direction of one of the solenoid coils along with reversing the phase of its excitation signal as compared to the excitation signal of the other solenoid coil.

Figure 3B:
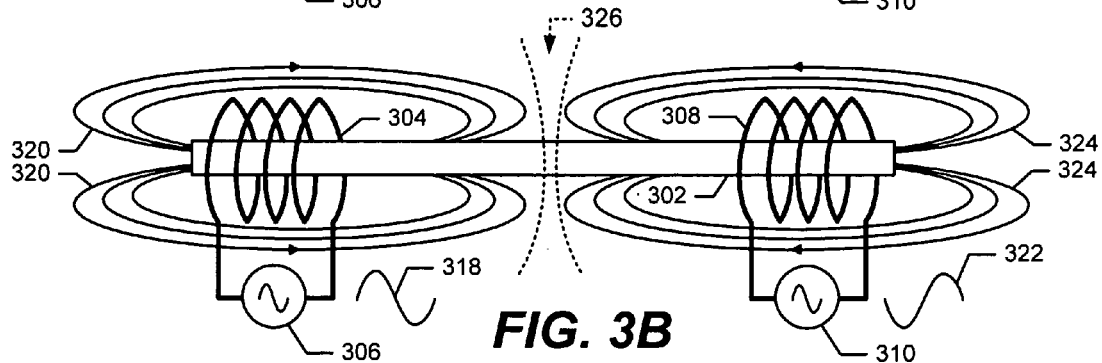
FIGS. 3B–D are a series of diagrams illustrating the generation of a moveable null RFID interrogation field using out-of-phase interrogator signals in accordance with one implementation of the present invention.

FIG. 3B is the first in a series of three diagrams illustrating the generation of a moveable null RFID interrogation field using out-of-phase interrogator signals in accordance with one implementation of the present invention. Left solenoid coil 304 and right solenoid coil 308 are wound at opposite ends of core 302. Left signal source 306, whose signal phase and amplitude are depicted by waveform 318, excites left solenoid coil 304. Similarly, right signal source 310, whose signal phase and amplitude are depicted by waveform 322, excites right solenoid coil 308. Signal 322 is similar in amplitude to, but 180 degrees out-of-phase with signal 318. Solenoid coil 304 produces RFID interrogator field 320 and solenoid coil 308 produces RFID interrogator field 324 whose polarity is opposite interrogator field 320. The proximity of opposite-polarity interrogator fields 320, 324 produces a null field region 326.

Signals 318 and 322 are oscillating signals that are termed to be "out-of-phase" because they both reach opposite positive and negative peaks at substantially the same time. The out-of-phase excitation of solenoid coils 304, 308 produces magnetic fields of opposite polarity with respect to the orientation of the solenoid coils. This results in interrogator fields 320, 324 with similar polarities meeting between solenoid coils 304, 308. The similar polarities of interrogator fields 320, 324 cancel one another and cause the formation of null field region 326. Excitation of solenoid coils 304, 308 with out-of-phase signals of substantially the same amplitude results in opposing fields of substantially the same strength. The symmetry in strength produced by solenoid coils 304, 308 in turn causes null field 326 to be positioned substantially halfway between left solenoid coil 304 and right solenoid coil 308. The subsequent examples of FIG. 3C and FIG. 3D show that the null interrogator field's position can be moved either to the right or the left by varying the relative amplitudes of the out-of-phase excitation signals.

Figure 3C:
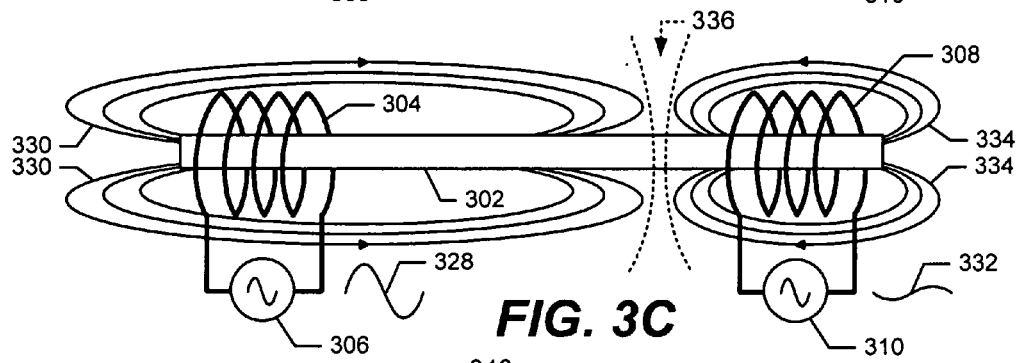

FIG. 3C is the second in a series of three diagrams illustrating the generation of a moveable null RFID interrogation field using out-of-phase interrogator signals in accordance with one implementation of the present invention. Left solenoid coil 304 and right solenoid coil 308 are wound on core 302. Left signal source 306, whose signal phase and amplitude are depicted by waveform 328, excites left solenoid coil 304. Similarly, right signal source 310, whose signal phase and amplitude are depicted by waveform 332, excites right solenoid coil 308. Signal 322 is less in amplitude to and 180 degrees out-of-phase with signal 328. Consequently, solenoid coil 304 produces RFID interrogator field 330 and solenoid coil 308 produces RFID interrogator field 334 whose polarity is opposite interrogator field 330. The proximity of opposite-polarity interrogator fields 330, 334 produces a null field region 336.

As with the example of FIG. 3B, the out-of-phase excitation of solenoid coils 304, 308 in FIG. 3C produces magnetic fields of opposite polarity with respect to the orientation of the solenoid coils. This results in interrogator fields 330, 334 with similar polarities meeting between solenoid coils 304, 308. The similar polarities of interrogator fields 330, 334 cancel one another and cause the formation of null field region 336. Excitation of solenoid coils 304, 308 with out-of-phase signals of different amplitudes results in opposing fields of different strengths. This in turn, causes null field 336 to be positioned nearer to right solenoid coil 308 due to its field 334 being weaker than the field 330 of left solenoid coil 304.

Figure 3D:
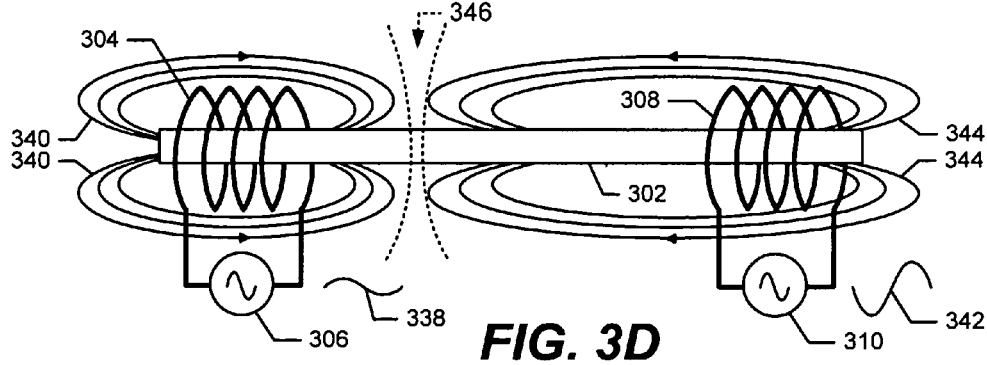

FIG. 3D is the third in a series of three diagrams illustrating the generation of a moveable null RFID interrogation field using out-of-phase interrogator signals in accordance with one implementation of the present invention. Left solenoid coil 304 and right solenoid coil 308 are wound on core 302. Left signal source 306 excites left solenoid coil 304 as depicted by waveform 338 having signal phase and amplitude as illustrated. Similarly, right signal source 310 excites right solenoid coil 308 as depicted by waveform 342 also having the illustrated signal phase and amplitude. Signal 338 is less in amplitude to and 180 degrees out-of-phase with signal 342. Solenoid coil 304 responds by producing RFID interrogator field 340 while solenoid coil 308 produces RFID interrogator field 344 whose polarity is opposite interrogator field 340. The proximity of opposite-polarity interrogator fields 340, 344 produces a null field region 346.

As previously described with reference to FIG. 3B, the out-of-phase excitation of solenoid coils 304, 308 in FIG. 3D produces magnetic fields of opposite polarity with respect to the orientation of the solenoid coils. This results in interrogator fields 340, 344 with similar polarities meeting between solenoid coils 304, 308. The similar polarities of interrogator fields 340, 344 repel one another and cause the formation of null field region 346. Excitation of solenoid coils 304, 308 with out-of-phase signals of different amplitudes results in opposing fields of different strengths. This in turn, causes null field 346 to be positioned nearer to left solenoid coil 304 due to its field 340 being weaker than the field 344 of right solenoid coil 308.

In general, increasing the amplitude of the solenoid coil excitation signal increases the magnetic strength of the interrogation field. Furthermore, increasing the strengths of two opposing interrogation fields by increasing the amplitudes of their out-of-phase interrogator signals decreases the width of the null interrogator field. In a similar manner, decreasing the amplitudes of the out-of-phase interrogator signals increases the null interrogator field's width.

Changing the magnetic strength as described effectively changes the width of the null field and its ability to select an RFID tag. Accordingly, one implementation of the present invention facilitates selectivity through proportional changes in the coil driver signal rather than altering the field distribution pattern or field shape. For example, a strong driver signal may generate a wide null interrogator field envelope causing multiple RFID tag signals to dropout. On the other hand, a weaker driver signal may generate a narrow null interrogator field unable to envelope even one RFID tag and effectuate the desired signal dropout. Calibrating the signal strength in accordance with this implementation generates a null interrogator field that envelopes a single RFID tag and facilitates the desired enumeration and ordering operations described later herein. Alternatively, another implementation may also alter the field distribution pattern or field shape in addition to the driver signal to further refine or control these effects if the field strength control does not provide the desired results.

Figure 4A:
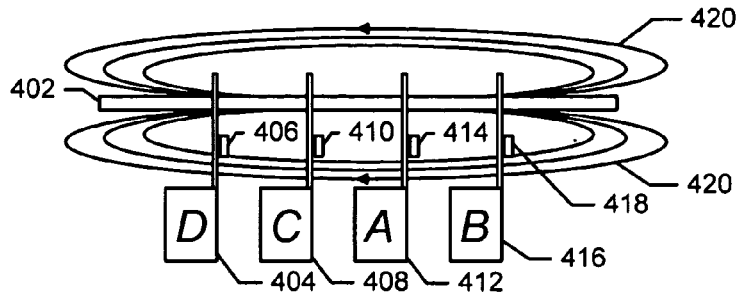
FIG. 4A is a diagram illustrating the interrogation of RFID tags using a uniform RFID interrogation field in accordance with one implementation of the present invention.

FIG. 4A is a diagram illustrating the interrogation of RFID tags using a uniform RFID interrogation field 420 in accordance with one implementation of the present invention. Uniform RFID interrogation field 420 surrounds a hanger support 402. Four items and their associated RFID tags are hung from hanger support 402: item D 404 with associated RFID tag 406, item C 408 with associated RFID tag 410, item A 412 with associated RFID tag 414, and item B 416 with associated RFID tag 418.

Uniform RFID interrogation field 420 interrogates RFID tags 406, 410, 414, 418 located in its vicinity. While the existence of the tags and their associated items can be determined, the sequential order of the tags on hanger support 402 cannot be determined by interrogation with a uniform RFID field. For example, the unordered list of all items on hanger support 402 could be represented as {A, B, C, D} and useful in alternate implementations of the present invention that do not require information on the particular order of the objects. However, implementations of the present invention that need the sequential order of the items combines the list of all items on hanger 402 {A, B, C, D} with other information to determine the sequential ordering of items.

Figure 4B:
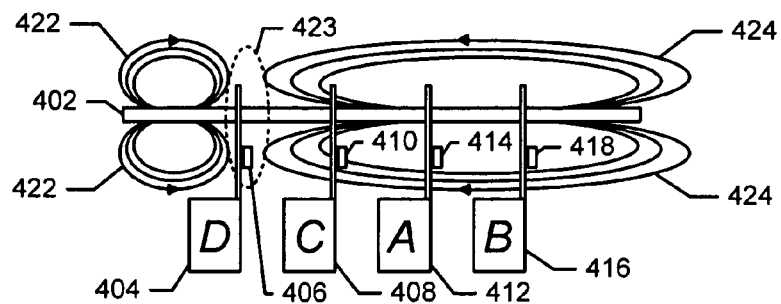
FIGS. 4B–E are a series of diagrams illustrating RFID tag enumeration using a moveable null RFID interrogation field in accordance with one implementation of the present invention.

FIG. 4B is the first in a series of four diagrams illustrating RFID tag enumeration using a moveable null RFID interrogation field 423 in accordance with one implementation of the present invention. A left RFID interrogation field 422 and a right RFID interrogation field 424 both surround hanger support 402 and repel one another to create a null region 423. Four items and their associated RFID tags are hung from hanger support 402: item D 404 with associated RFID tag 406, item C 408 with associated RFID tag 410, item A 412 with associated RFID tag 414, and item B 416 with associated RFID tag 418.

Null field 423 encompasses RFID tag 406, causing its RFID tag signal to dropout due to a lack of excitation energy. Right RFID interrogator field 424 encompasses RFID tags 410, 414, 418 associated with items C 408, A 412 and B 416 respectively. Since the signal from tag 406 of item D 404 has dropped out, the list of items apparently on hanger support 402 is now {A, B, C}. Comparing the current list of items {A, B, C} with the original list of all items {A, B, C, D} yields item D 404 as the item whose RFID tag is within null field 423. Item D 404 is then placed in an empty ordered-items list {D}.

Figure 4C:
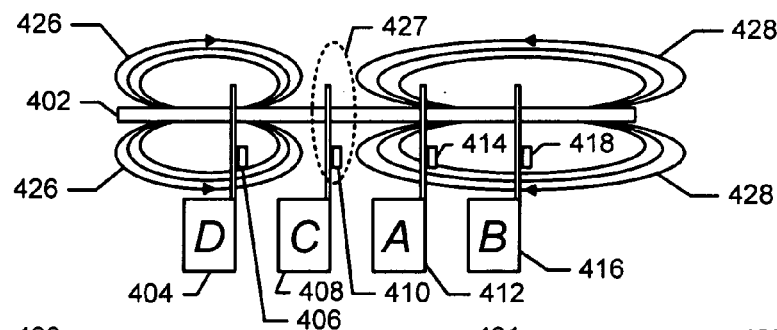

FIG. 4C is the second of a series of four diagrams illustrating RFID tag enumeration using a moveable null RFID interrogation field 427 in accordance with one implementation of the present invention. A left RFID interrogation field 426 and a right RFID interrogation field 428 both surround hanger support 402 and repel one another to create a null region 427. Four items and their associated RFID tags are hung from hanger support 402: item D 404 with associated RFID tag 406, item C 408 with associated RFID tag 410, item A 412 with associated RFID tag 414, and item B 416 with associated RFID tag 418.

Null field 427 encompasses RFID tag 410, causing its RFID tag signal to dropout due to a lack of excitation energy. Left RFID interrogator field 426 encompasses RFID tag 406 associated with item D 404. Right RFID interrogator field 428 encompasses RFID tags 414, 418 associated with items A 412 and B 416 respectively. Since the signal from tag 410 of item C 408 has dropped out, the list of items apparently on hanger support 402 is now {A, B, D}. Comparing the current list of items {A, B, D} with the original list of all items {A, B, C, D} yields item C 408 as the item whose RFID tag is within null field 427. Item C 408 is then added to the ordered-items list {D, C}.

Figure 4D:
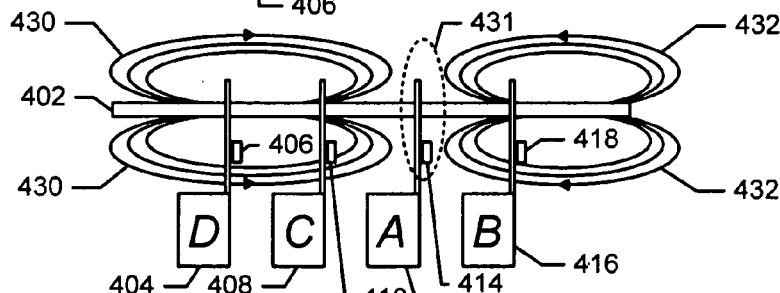

FIG. 4D is the third of a series of four diagrams illustrating RFID tag enumeration using a moveable null RFID interrogation field 431 in accordance with one implementation of the present invention. A left RFID interrogation field 430 and a right RFID interrogation field 432 both surround hanger support 402 and repel one another to create a null region 431. Four items and their associated RFID tags are hung from hanger support 402: item D 404 with associated RFID tag 406, item C 408 with associated RFID tag 410, item A 412 with associated RFID tag 414, and item B 416 with associated RFID tag 418.

Null field 431 encompasses RFID tag 414, causing its RFID tag signal to dropout due to a lack of excitation energy. Left RFID interrogator field 430 encompasses RFID tags 406, 410 associated with items D 404 and C 408. Right RFID interrogator field 432 encompasses RFID tag 418 associated with item B 416. Since the signal from tag 414 of item A 412 has dropped out, the list of items apparently on hanger support 402 is now {B, C, D}. Comparing the current list of items {B, C, D} with the original list of all items {A, B, C, D} yields item A 412 as the item whose RFID tag is within null field 431. Item A 412 is then added to the ordered-items list {D, C, A}.

Figure 4E:
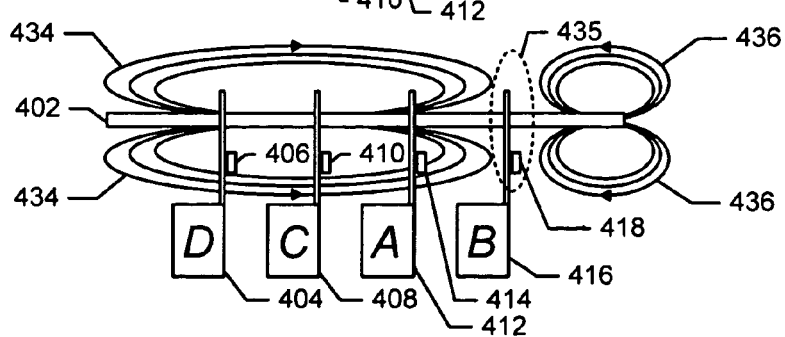

FIG. 4E is the fourth of a series of four diagrams illustrating RFID tag enumeration using a moveable null RFID interrogation field 435 in accordance with one implementation of the present invention. A left RFID interrogation field 434 and a right RFID interrogation field 436 both surround hanger support 402 and repel one another to create a null region 435. Four items and their associated RFID tags are hung from hanger support 402: item D 404 with associated RFID tag 406, item C 408 with associated RFID tag 410, item A 412 with associated RFID tag 414, and item B 416 with associated RFID tag 418.

Null field 435 encompasses RFID tag 418, causing its RFID tag signal to dropout due to a lack of excitation energy. Left RFID interrogator field 434 encompasses RFID tags 406, 410, 414 associated with items D 404, C 408, and A 412 respectively. Since the signal from tag 418 of item B 416 has dropped out, the list of items apparently on hanger support 402 is now {A, C, D}. Comparing the current list of items {A, C, D} with the original list of all items {A, B, C, D} yields item B 416 as the item whose RFID tag is within null field 435. Item B 416 is then added to the ordered-items list {D, C, A, B}, which represents the sequential ordering of items on hanger support 402.

Figure 5:
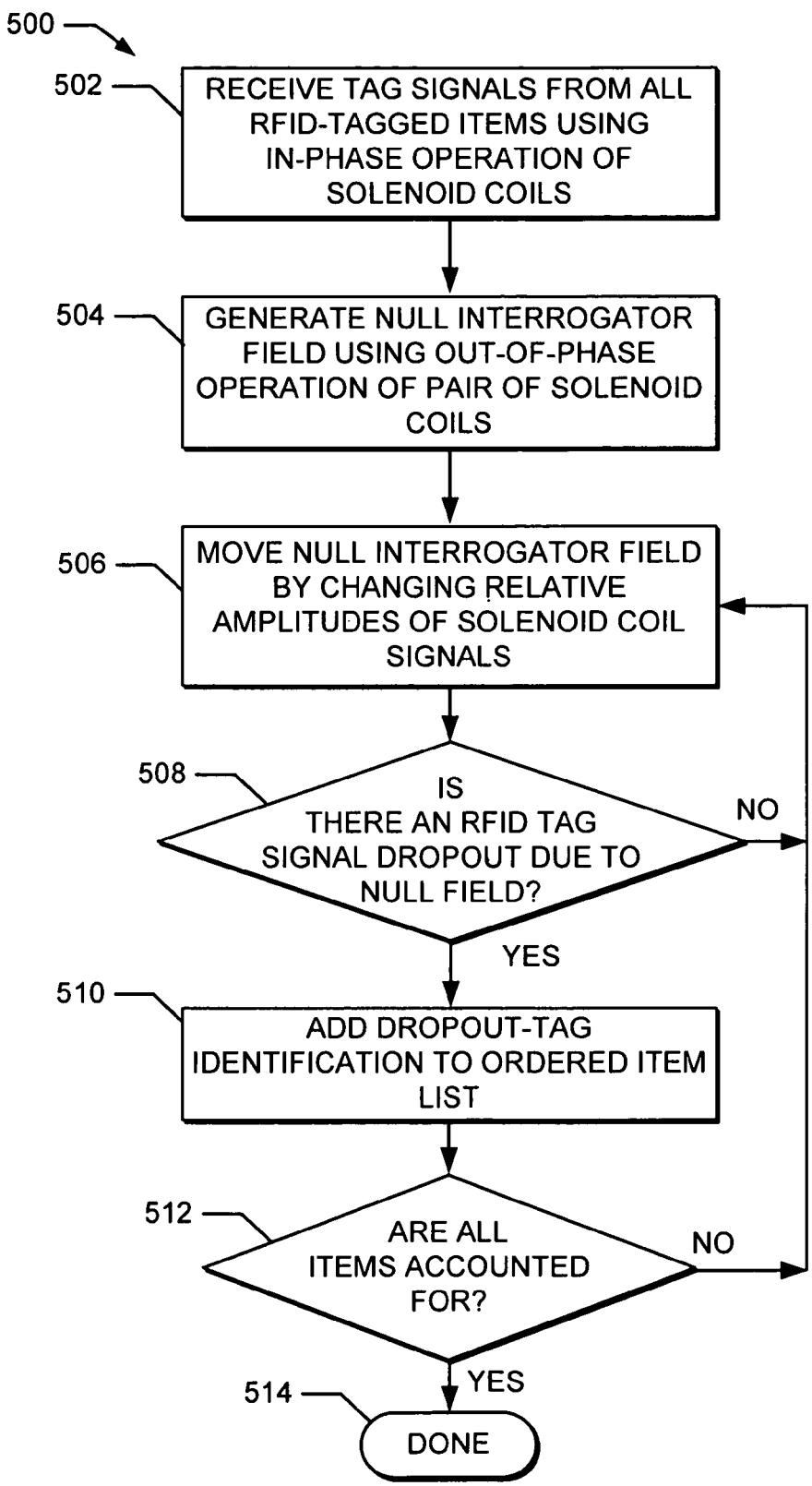
FIG. 5 is a flowchart diagram of the operations pertaining to enumerating RFID-tagged objects in accordance with one implementation of the present invention.

FIG. 5 is a flowchart diagram 500 of the operations pertaining to enumerating RFID-tagged objects in accordance with one implementation of the present invention. The process of enumeration of an aggregate of RFID-tagged items begins by interrogating the aggregate using in-phase operation of a set of two or more solenoid coils and receiving tag signals from all the RFID-tagged items (502). As previously described, knowing the identities of all items in the aggregate aids in the later determination of the sequential ordering of items.

Next, a null interrogator field is generated using out-of-phase operation of a pair of solenoid coils (504). As previously described, out-of-phase operation of two solenoid coils creates opposing RFID interrogator fields that repel one another to create the null interrogator field. The null region has insufficient electromagnetic energy to operate an RFID tag. This causes the tag's signal to dropout, effectively causing the tagged item to disappear from the view of the interrogator.

Changing relative amplitudes of the solenoid coil signals moves the null interrogator field to a different position (506). Each solenoid coil creates a magnetic force field shaped by the particular signal. When the magnetic force pushes against an equal opposing magnetic force, a point of balance, i.e., null field, will be halfway between the sources of the two forces. Making one force stronger shifts the point of balance in the direction of the weaker force. In this manner, increasing the relative amplitude of one of a pair of solenoid coils excited by out-of-phase signals moves the null interrogator field towards the coil excited with the lesser amplitude signal.

After moving the null interrogator field, the enumeration operation determines if there has been an RFID-tag signal dropout due to an RFID tag residing in the vicinity of the null field (508). RFID-tag signal dropout is determined by comparing the list of tags resulting from out-of-phase interrogation with the list of tags resulting from in-phase interrogation. RFID-tag signal dropout is indicated when there is a missing item identification from the out-of-phase interrogation list. If there is no signal dropout then the null interrogation field is moved again (506).

If there is a signal dropout due to the null interrogation field encompassing an RFID tag, the enumeration operation adds the dropout-tag identification to an ordered-item list (510). The order of item identifications in the ordered item list reflects the sequential ordering of the items in the aggregate of items.

The enumeration operation next determines if all items are accounted for (512). If there are still items to be accounted for, the null interrogation field is moved (506) and the operation is repeated. If all items are accounted for then the enumeration operation is done (514). The resulting ordered-item list contains identifications of all the interrogated items and the order of the item identifications in the list reflects the sequential ordering of the items in the aggregate of items.

Figure 6:
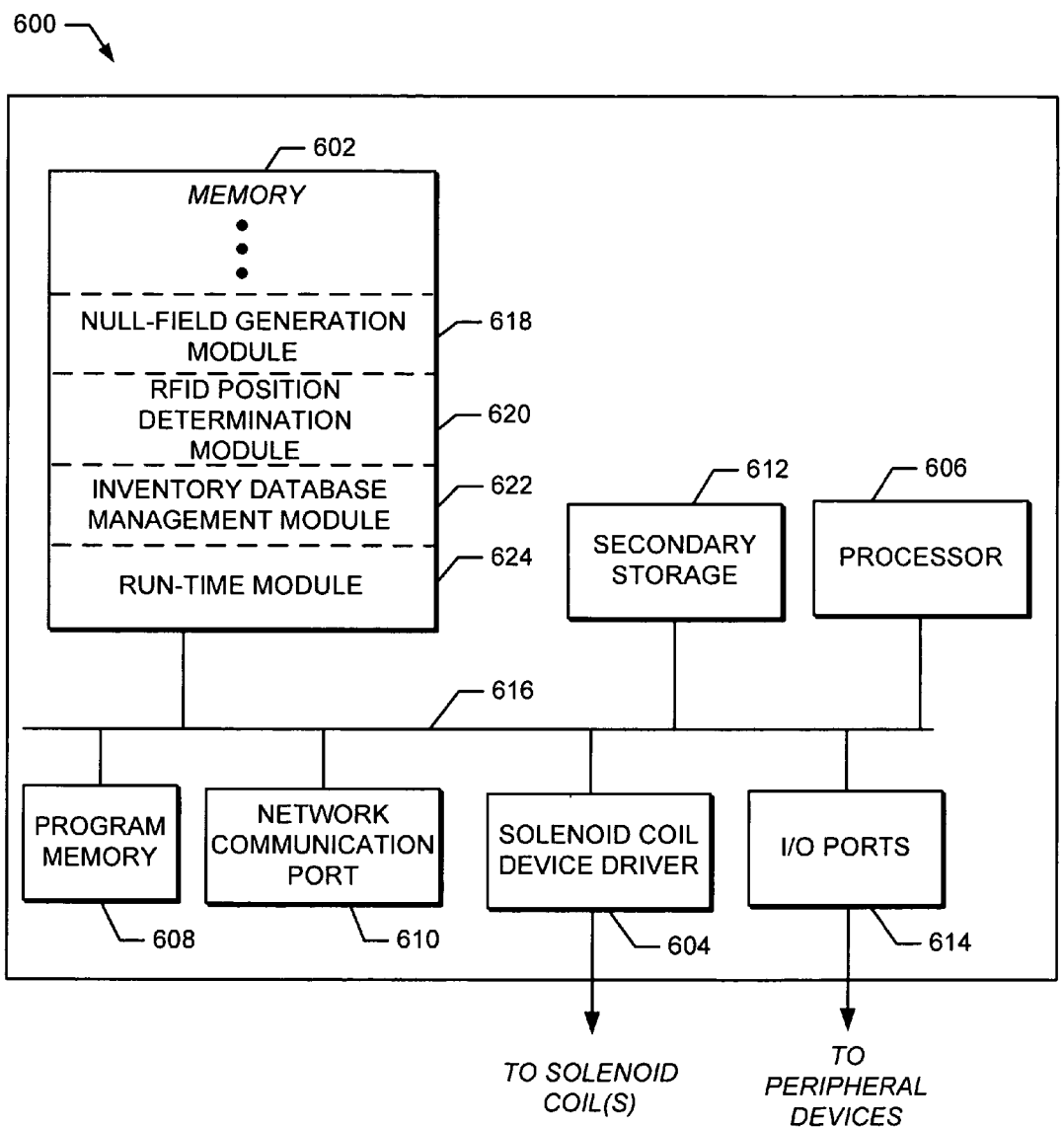
FIG. 6 is a diagram of a system used to enumerate RFID-tagged objects in conjunction with an interrogator and in accordance with one implementation of the present invention.

FIG. 6 is a diagram of a system 600 used in one implementation for performing the apparatus or methods of the present invention. In one implementation, system 600 is embedded in and part of the hanger apparatus of the present invention as illustrated in FIG. 2A. Alternatively, system 600 is computer system separate from the hanger apparatus of the present invention and controls the hanger apparatus over a network at some other remote location.

System 600 includes a memory 602 to hold executing programs (typically random access memory (RAM) or writable read-only memory (ROM) such as a flash ROM), an solenoid coil device driver 604 capable of interfacing and driving one or more solenoid coils, a processor 606, a program memory 608 for holding drivers or other frequently used programs, a network communication port 610 for data communication, a secondary storage 612 with secondary storage controller, and input/output (I/O) ports 614 also with I/O controller operatively coupled together over an interconnect 616. The system 600 can be preprogrammed, in ROM, for example, using field-programmable gate array (FPGA) technology or it can be programmed (and reprogrammed) by loading a program from another source (for example, from a floppy disk, a CD-ROM, or another computer). Also, system 600 can be implemented using customized application specific integrated circuits (ASICs).

In one implementation, memory 602 includes a null-field generation module 618, an RFID position determination module 620, an inventory database management module 622 and a run-time module 624 that manages system resources used when processing one or more of the above components on system 600.

Null-field generation module 618 calculates positioning information to systematically move the null field along the hanger in accordance with the present invention. For example, these calculations may include the relative strength, phase and polarity of signals to be delivered to the various solenoid coils and the order for delivering these different signals.

RFID position determination module 620 analyzes the results produced when the different null fields are generated. The information generated allows RFID position determination module 620 to determine the sequence of items on a hanger, the aggregate of items in the vicinity of the hanger as well as other anomalous information about the items. For example, RFID position determination module 620 can flag when the order of the items are not coincident with the default or desired ordering of the items (i.e., oldest items first, newest items first or random distribution of items).

Inventory database management module 622 keeps track of the items identified by the above modules and apparatus. This module is responsible for rebuilding and indexing the inventory database to satisfy database performance and integrity as required by the particular application or implementation. For example, the database indices may need to be rebuilt each time an item is removed or added to a hanger device of the present invention.

While examples and implementations have been described, they should not serve to limit any aspect of the present invention. Accordingly, implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

Further, while specific embodiments have been described herein for the purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A system for identifying RFID-tagged items, comprising:
    one or more interrogator units capable of communicating over a network, the interrogator unit comprising a hanger support upon which RFID-tagged items are stored, the hanger support further comprising one or more solenoid coils aligned with the hanger support's longitudinal axis;
    a computer capable of communicating over the network; and
    an inventory database indexable by item identification, including the ordering of the items on the hanger support, and capable of communicating over the network.

2. The system of claim 1 wherein one or more solenoid coils are operated to produce a uniform interrogator field for determining item identification using RFID.

3. The system of claim 2 wherein the computer queries the interrogator unit at intervals.

4. The system of claim 1 wherein two or more solenoid coils are operated to produce a null interrogator field for determining item identification using RFID.

5. The system of claim 1 wherein the computer queries the interrogator unit as to the ordering of the items stored upon the hanger support.

6. The system of claim 1 wherein the computer receives a message from the interrogator unit as to a hanger support identity and the identity and ordering of the items stored upon the hanger support.

7. The system of claim 6 wherein the computer receives a message from the interrogator unit when the ordering of the items stored upon the hanger support changes.

8. The system of claim 6 wherein the computer receives a message from the interrogator unit when the ordering of the items stored upon the hanger support differs from a predetermined ordering.

9. The system of claim 1 wherein the network comprises the Internet.

10. An apparatus for identifying a stored item, comprising:
    a hanger support upon which items identified with RFID tags are stored; and
    a pair of solenoid coils, one at either end of the hanger support and aligned with the hanger support's longitudinal axis; and
    wherein the solenoid coils are excited by out-of-phase RFID interrogator signals to produce a null interrogator field.

11. The apparatus of claim 10 wherein the null interrogator field's location is changed by controlling the relative amplitudes of the out-of-phase interrogator signals.

12. The apparatus of claim 10 wherein decreasing the amplitudes of the out-of-phase interrogator signals increases the null interrogator field's width.

13. The apparatus of claim 10 wherein increasing the amplitudes of the out-of-phase interrogator signals decreases the null interrogator field's width.

14. A method for identifying stored items, comprising:
    receiving RFID tag signals from the stored items;
    generating a null RFID interrogator field; and
    moving the null RFID interrogator field to identify an item by its RFID tag signal dropout in response to the null RFID interrogator field encompassing the item's RFID tag.

15. The method of claim 14 wherein receiving the RFID tag signals further comprises using in-phase operation of solenoid coils.

16. The method of claim 14 wherein generating the null RFID field further comprises using out-of-phase operation of solenoid coils.

17. The method of claim 14 wherein moving the null RFID interrogator field further comprises changing relative amplitudes of solenoid coil signals.

18. The method of claim 14 further comprising adding the identified item to an ordered item list.

19. The method of claim 18 wherein when the ordered item list contains all the item identifications from the received RFID tag signals, the ordering of the list represents the ordering of the items.

20. An apparatus for identifying stored items, comprising:
means for receiving RFID tag signals from the stored items;
means for generating a null RFID interrogator field; and
means for moving the null RFID interrogator field to identify an item by its RFID tag signal dropout in response to the null RFID interrogator field encompassing the item's RFID tag.

* * * * *

UNITED STATES PATENT AND TRADEMARK OFFICE
CERTIFICATE OF CORRECTION

| | | |
|---|---|---|
| PATENT NO. | : 7,102,521 B2 | Page 1 of 1 |
| APPLICATION NO. | : 10/836547 | |
| DATED | : September 5, 2006 | |
| INVENTOR(S) | : Geoff M. Lyon | |

It is certified that error appears in the above-identified patent and that said Letters Patent is hereby corrected as shown below:

In column 4, line 56, delete "arc" and insert -- are --, therefor.

Signed and Sealed this

Fifth Day of January, 2010

David J. Kappos
*Director of the United States Patent and Trademark Office*